United States Patent
Dutilleul et al.

(10) Patent No.: US 7,334,821 B2
(45) Date of Patent: Feb. 26, 2008

(54) PREMIUM THREADED TUBULAR JOINT COMPRISING AT LEAST A THREADED ELEMENT WITH END LIP

(75) Inventors: Pierre Dutilleul, Jeanlain (FR); Gabriel Roussie, Mons en Baroeul (FR)

(73) Assignees: Vallourec Mannesmann Oil & Gas France, Aulnove-Avmeries (FR); Sumitomo Metal Industries, Ltd., Osaka-shi (JP)

( * ) Notice: Subject to any disclaimer, the term of this patent is extended or adjusted under 35 U.S.C. 154(b) by 136 days.

(21) Appl. No.: 10/493,069

(22) PCT Filed: Dec. 3, 2002

(86) PCT No.: PCT/FR02/04144

§ 371 (c)(1),
(2), (4) Date: Apr. 30, 2004

(87) PCT Pub. No.: WO03/048623

PCT Pub. Date: Dec. 6, 2003

(65) Prior Publication Data

US 2004/0262919 A1 Dec. 30, 2004

(30) Foreign Application Priority Data

Dec. 7, 2001 (FR) .................................. 01 15870

(51) Int. Cl.
*F16L 25/00* (2006.01)
(52) U.S. Cl. ...................... 285/333; 285/355; 285/390
(58) Field of Classification Search ............... 285/333, 285/334, 355, 390
See application file for complete search history.

(56) References Cited

U.S. PATENT DOCUMENTS 3,489,437 A 1/1970 Duret
3,870,351 A 3/1975 Matsuki (Continued)

FOREIGN PATENT DOCUMENTS

CN 85 1 04254 10/1987

(Continued)

OTHER PUBLICATIONS

Andrei Muradov, et al., "Development of external pressure resistant tool joint for under-balanced drilling", SPE/IADC 68771 2001.

(Continued)

*Primary Examiner*—Aaron Dunwoody
(74) *Attorney, Agent, or Firm*—Oblon, Spivak, McClelland, Maier & Neustadt, P.C.

(57) ABSTRACT

A premium threaded tubular connection including, on at least one threaded element, a distal abutment surface at the free end of a threaded element, and a lip sealing surface at a given distance from the threading. The lip includes an appendix that extends the lip towards its free end beyond the lip sealing surface so that the lip has both high radial stiffness and low axial stiffness. This results in enhanced performance as regards the seal of the threaded connection under pressure and/or under tension, and other advantages of precision of real makeup torque, mechanical strength in axial compression, a shock barrier effect, and tolerance in engaging the threaded elements.

47 Claims, 6 Drawing Sheets

U.S. PATENT DOCUMENTS

| | | | |
|---|---|---|---|
| 4,384,737 A * | 5/1983 | Reusser | 285/334 |
| 4,494,777 A | 1/1985 | Duret | |
| 4,611,838 A | 9/1986 | Heilmann et al. | |
| 4,623,173 A | 11/1986 | Handa et al. | |
| 4,624,488 A | 11/1986 | Furgerson | |
| 4,795,200 A | 1/1989 | Tung | |
| 5,649,725 A | 7/1997 | Nagasaku et al. | |
| 5,687,999 A | 11/1997 | Lancry et al. | |
| 6,047,997 A | 4/2000 | Olivier | |
| 2004/0262919 A1 | 12/2004 | Dutilleul et al. | |

FOREIGN PATENT DOCUMENTS

| | | |
|---|---|---|
| CN | 2366656 | 3/2000 |
| EP | 0488912 | 6/1992 |
| FR | 1489013 | 7/1967 |
| WO | 99/08034 | 2/1999 |
| WO | 00/22339 | 4/2000 |

OTHER PUBLICATIONS

Edmond I. Bailey, "Development of gas tight seal for tool joint", SPE 49202 1998.

Michael J. Jellison, et al. "New developments in drill stem rotary shoulder connections" IADC/SPE 62785 2000.

U.S. Appl. No. 10/558,410, filed Nov. 28, 2005, Verger et al.

* cited by examiner

PREMIUM THREADED TUBULAR JOINT COMPRISING AT LEAST A THREADED ELEMENT WITH END LIP

BACKGROUND OF THE INVENTION

1. Field of the Invention

The invention relates to premium threaded tubular connections comprising at least one set of metal-metal sealing surfaces and makeup abutments on male and female elements that make up the threaded connection, the threaded elements being formed at the end of a tubular component of a great-length pipe or short (coupling) type.

2. Description of the Related Art

Many types of threaded tubular connections are known, primarily used to constitute casing strings or tubing strings or drillpipe strings for hydrocarbon or the like wells, such as geothermal wells.

Threaded tubular connections are also known on riser columns for connecting sea bottom wells to offshore production platforms.

Such threaded tubular connections are subjected to a variety of overall stresses (axial tension or compression, internal or external fluid pressure, bending, torsion), which may be combined (for example axial tension+internal pressure), possibly with fluctuating intensity.

Premium threaded tubular connections not only have to resist rupture but must also remain tightly sealed, in particular to gas, despite such stresses that may be combined and despite tough on-site service conditions.

The stresses may change in nature as the pipes are lowered into the well or during operation; as an example, tensile stresses may briefly change into compressive stresses.

Threaded connections must also be capable of being made up and broken out many times without degradation in performance, in particular by galling.

After breakout, the tubular components can be re-used in other wells under different service conditions.

French patent FR 1 489 013 and European patent EP 0 488 912 describe examples of such premium threaded tubular connections, in particular for a threaded and coupled connection with two great-length pipes joined via a threaded coupling.

U.S. Pat. Nos. 5,687,999 and 4,494,777 describe other examples of an integral premium threaded tubular connection directly connecting two great-length pipes.

The threaded tubular connections described in FR 1 489 013, EP 0 488 912 and U.S. Pat. No. 4,494,777 have a front axial abutment surface at the free end of at least one of the threaded elements, generally the male element, and a sealing surface on a peripheral surface of a threaded element immediately adjacent the front surface of the same threaded element.

The portion of the threaded element between the first thread of the threading and the front axial abutment surface at the free end is generally termed a lip.

In many premium threaded connections and in particular for the last three cited patents, the male sealing surface is located at the end of the male lip, which varies in length depending on the threaded connections.

When a premium threaded tubular connection is made up into the made-up position, the axial abutments are in contact pressure to create a reaction equal to a given makeup torque $T_m$.

The corresponding male and female sealing surfaces then exhibit radial interference generating a contact pressure and the thread flanks termed "load flanks" located on the thread on the side opposite the free end of the threaded element are in contact under contact pressure, placing the lip under axial compression.

The interfering sealing surfaces can cause problems with galling during make up if they have an unsuitable geometry. They can also run the risk of leaking in service if the contact pressure, and in particular the integrated contact pressure over the active width of the sealing surfaces, is insufficient.

To avoid the risk of leaking, the integrated contact pressure must remain above a certain value expressed in N/mm; for a given geometry, this integrated contact pressure is a function of the relative positioning of the elements at the end of makeup and the service stresses.

It is particularly difficult to obtain a threaded tubular connection that resists, in a manner equivalent to a pipe, the different stresses in service and which remains gas tight under such stresses, the stress after makeup being modified by the application of external stresses in service, for example axial tension or compression, bending, internal or external pressure.

SUMMARY OF THE INVENTION

We have sought to develop a premium threaded tubular connection with an axial abutment located at the free end of the lip of at least one threaded element that has a maximum resistance to leakage when the threaded connection is subjected to high internal or external pressures and that preserves such resistance to leakage when the threaded connection is subjected to a high external tensile force, which tensile force tends to separate the corresponding abutment surfaces axially, and in particular the sealing surfaces.

The tensile force can originate from axial or bending tensile stresses. The terms "tensile force" or "tensile load" as used in the remainder of the present document means the set of external stresses that subjects all or a portion of the threaded tubular connection to such stresses or loads.

Such a threaded tubular connection can be characterized by the variation in the integral of the contact pressure between the sealing surfaces over their width (or integrated contact pressure) as a function of the tensile load, expressed as a % of the load corresponding to the yield strength of the pipes in the string.

We have also sought to minimize the risks of galling on makeup of the threaded tubular connection.

We have also sought to provide an invention that advantageously applies to a threaded connection comprising at least two axial abutments, one of which is external and the other, internal.

We have also sought to provide a threaded connection that can easily be made up on-site.

We have also sought to provide theoretical sealing performances for the threaded connection that are not susceptible of being significantly reduced due to difficult on-site operating conditions.

The threaded connection of the invention comprises firstly, in known manner, a male threaded element at the end of a first tubular component and a female threaded element at the end of a second tubular component.

The male threaded element comprises a male threading, at least one male sealing surface on the external peripheral surface and at least one male surface on the axial abutment.

The female threaded element correspondingly comprises a female threading, at least one female sealing surface on its internal peripheral surface and at least one female axial abutment surface.

The male threading is made up into the female threading until at least one male axial abutment surface abuttingly co-operates, producing a reaction to the makeup torque with the corresponding female axial abutment surface, each male sealing surface then interfering with the corresponding female sealing surface.

On at least one threaded element, an abutment surface in abutment reaction among the abutment surface or surfaces is produced on the front surface of the free end of the threaded element and is termed the distal axial abutment surface.

A lip separates the distal axial abutment surface from the threading on the threaded element under consideration, one sealing surface termed the "lip sealing surface" being disposed on this lip at a given axial distance from the end of the threading.

The lip is thus subjected to axial compressive loads resulting from the distal axial abutment surface abutting in abutment reaction with the corresponding axial abutment surface.

In accordance with the characterizing feature of the invention, the lip comprises a portion termed the "appendix" between the lip sealing surface and the distal axial abutment surface at the free end of the lip.

This appendix can produce a lip that has both high radial stiffness and low axial stiffness.

U.S. Pat. Nos. 4,624,488 and 4,795,200 describe threaded connections with an appendix between a sealing surface and a front surface of the free end of a threaded element.

However, neither of these two patents discloses a front surface of the free end as an abutment surface in reactive abutment to the makeup torque, and the appendix does not carry out the same set of functions.

The appendix in Ferguson (U.S. Pat. No. 4,624,488) provides protection against damage resulting from knocks during on-site manipulation and increases the ultimate tensile strength of the threaded connection under axial tension.

In addition the appendix in Tung (U.S. Pat. No. 4,795,200) can increase the radial stiffness of the lip on a threaded connection without the distal axial abutment surface, thus increasing the contact pressure at the sealing surfaces on this threaded connection.

Firstly, the inventors have noted that the appendix of the present invention also increases the radial stiffness of the lip on a threaded tubular connection with a distal axial abutment surface and that this increase in stiffness results for a premium threaded tubular connection, in an increase in the effective axial contact width of the sealing surface on the lip and in the integrated contact pressure on this distal axial abutment width.

Such an increase is not obvious compared with the teaching of the Tung patent as axial compression of the lip generally tends to "banana" or bow the lip and would reduce the effective contact width of the sealing surfaces and the integrated contact pressure.

The inventors have also noted that, non obviously, the increase in the radial stiffness due to the appendix also results, for a premium threaded tubular connection of the invention, in an increase in the effective radial contact width of the distal axial abutment surface and in the integrated contact pressure over the radial width of this distal axial abutment surface.

Such an effect cannot be known or deduced from the Tung patent, which does not consider such distal axial abutment surfaces.

The inventors have also noted a further non obvious effect of the appendix on the threaded tubular connection of the invention.

The appendix reduces the axial stiffness of the lip and as a result, increases the elastic deformation of the lip at constant axial compressive stress.

When a tensile load is exerted on the threaded connection, this increased elastic deformation can shift the detachment of the abutment and especially the critical value of the integrated contact pressure over the width of the lip sealing surface towards relatively high tensile loads.

Here again, such an effect could not be discovered or deduced in an obvious manner from the Tung patent, which does not consider threaded tubular connections provided with a distal abutting sealing surface and which does not consider the risks of leakage under tensile stresses.

Further beneficial effects and advantages of the appendix on the premium threaded tubular connection of the invention can be deduced from the particular embodiments of the invention that are discussed below.

On the lip sealing surface side, the appendix can be bordered by any peripheral surface, but a substantially cylindrical peripheral surface is preferred to maximize the radial thickness of the distal axial abutment surface.

Preferably, the axial length of the appendix is in the range 8% to 75% of the total length of the lip, and more particularly between 20% and 60% thereof.

Preferably, the ratio of the axial length of the appendix to the radial thickness of the distal axial abutment surface is less than 3.

Advantageously, each lip sealing surface is a surface selected from the group formed by conical, toric or complex surfaces comprising a combination of conical surfaces, cylindrical surfaces and/or one or more toric surfaces.

Highly advantageously, one or at least one lip sealing surface is a complex surface comprising two surface portions that are mutually tangential, namely a conical portion located on the side of the distal axial abutment surface and a toric surface with a large radius, for example with a radius of more than 20 mm, located on the threading side, the corresponding sealing surface on the other threaded element being a conical surface with a substantially identical taper to that of the conical portion of the lip sealing surface and with an axial width adapted to the total axial width of the lip sealing surface.

Independently of the presence or otherwise of an appendix, such a complex surface configuration can increase the integrated contact pressure over the width of the lip sealing surface.

Highly preferably, the mean inclination of each lip sealing surface is at least 10° with respect to the axis of the threaded connection.

Highly preferably, the axial width of the lip sealing surface is 10 mm or less, preferably 5 mm or less.

Preferably, the distal axial abutment surface is a planar surface perpendicular to the axis of the threaded connection or a conical surface coaxial with the threaded connection with an apex half angle in the range 70° to 90°, which in the latter case tends to encourage contact between the lip sealing surface and the corresponding sealing surface.

BRIEF DESCRIPTION OF THE DRAWINGS

The accompanying figures illustrate certain embodiments of the invention which will now be described in detail.

DETAILED DESCRIPTION OF THE PREFERRED EMBODIMENTS

Figure 1:
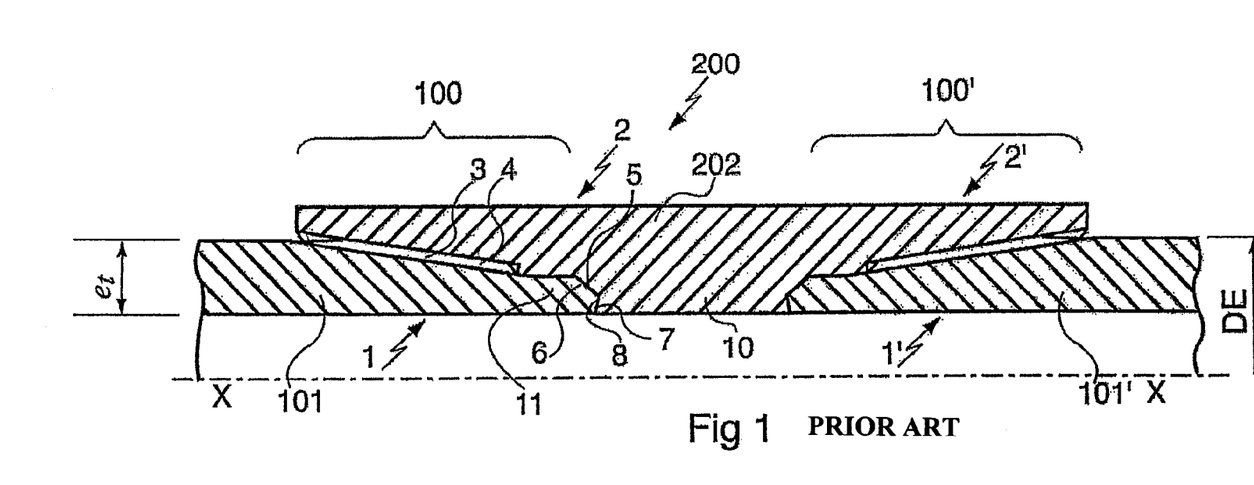
FIG. 1 shows a half axial cross section of a prior art threaded and coupled tubular connection.

FIG. 1 shows a prior art threaded and coupled tubular connection 200 between two pipes 101, 101', which are great-length pipes, via a coupling 202 which is a short-length tubular component.

The term "pipe" or "great-length tubular component" means pipes several meters long, for example about 10 m long.

Connections 200 are routinely used to produce casing or tubing strings for hydrocarbon wells, risers or for drillpipe strings for said wells.

The pipes can be produced from any type of non alloyed, light alloy or heavy alloy steel or even from heat treated or cold-worked ferrous or non ferrous alloys depending on the service conditions such as: mechanical stress level, corrosive nature of the fluid internal to or externally of the pipes.

It is also possible to use steel tubes with low corrosion resistance provided with a coating, for example of synthetic material preventing any contact between the steel and the corrosive fluid.

The ends of pipes 101, 101' are provided with identical male elements 1, 1' and are coupled via a coupling 202 provided with a female threaded element 2, 2' at each end.

The male threaded elements 1, 1' are respectively connected by making up into female threaded elements 2, 2' to constitute two symmetrical threaded connections 100, 100' connected by a lug 10 several centimeters long.

Lug 10 of the coupling has an internal diameter that is substantially identical to that of the end of pipes 101, 101' so that the flow of internal fluid is not disturbed.

The threaded tubular connections 100, 100' are symmetrical, and so the function of only one of these connections needs to be described, for example threaded tubular connection 100.

Male threaded element 1 comprises a male threading 3 with trapezoidal threads of the type known as "buttress" threads as defined in API specification 5B (API=American Petroleum Institute); this male threading 3 is tapered and disposed on the outside of the male element and is separated from the free end 7 of said element by a non threaded lip 11. The free end 7 constitutes an annular surface with an axial abutment termed a distal axial abutment surface disposed substantially transversely.

Next to the free end 7 on the external surface of lip 11 is a conical surface 5 forming a male lip sealing surface; its taper is greater than that of the male threading 3.

The female element 2 comprises means that mate with those of male element 1, i.e., they match in terms of their shape and are arranged to co-operate by their disposition on the female threaded element with the male means on the male threaded element.

Female element 2 comprises an internal tapered female threading 4 and a non threaded portion between the threading and the lug 10.

This non threaded portion comprises an annular axial abutment surface 8 with a substantially transverse orientation forming a shoulder at the end of the lug and a conical surface 6 forming a female sealing surface immediately adjacent to the shoulder on the threading side 4.

After complete makeup of the male threading in the female threading, abutment surfaces 7 and 8 bear against each other while bearing surfaces 5, 6 radially interfere and are thus under metal-metal contact pressure. Surfaces 5, 6 then constitute metal-metal sealing surfaces that aim at rendering the threaded connection tight even to high internal or external fluid pressures, against gaseous fluids and for various stresses (axial tension, axial compression, bending, torsion . . . ), simple or combined, static or fluctuating.

Such threaded connections are termed premium connections due to their performances compared with standard threaded tubular connections such as those defined by API specification 5CT.

Figure 8:
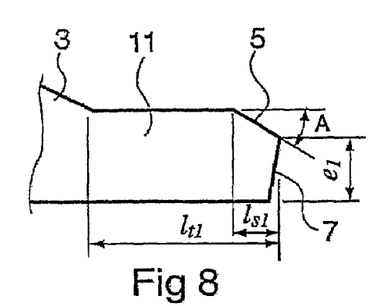
FIG. 8 diagrammatically shows the free end of the male threaded element of FIG. 1 (prior art).
Figure 9:
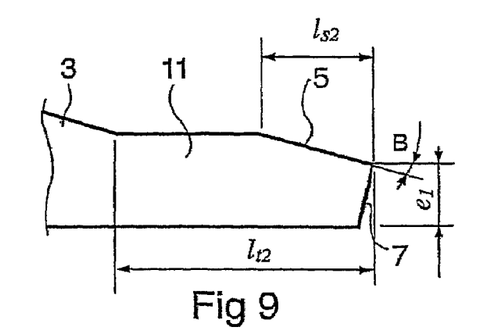
FIGS. 9 to 11 diagrammatically show three variations of the prior art free end of FIG. 8.
Figure 10:
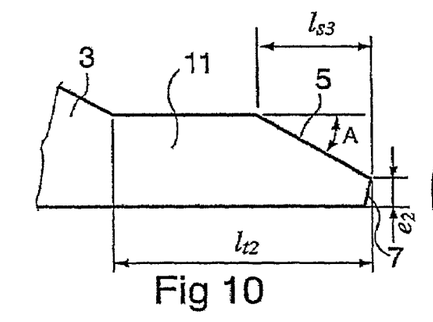

Threaded tubular connections such as 100 in FIG. 1 must, however, accommodate contradictory geometrical imperatives explained in FIGS. 8 to 10.

The length and thickness of the lip at the lip sealing surface must be sufficient to obtain a given radial stiffness in the lip, which behaves like a spring (see FIG. 8); the contact pressure for a given radial interference then varies with the radial stiffness of lip 11.

However, when the threaded connection is subjected to an internal or external fluid pressure, the lip bends, which induces a mismatch in the angles of the sealing surfaces 5 and 6 and thus, a reduction in the effective contact width and of the integrated contact pressure. Bending of the lip due to fluid pressure is greater when the portion of lip 35 between the start of threading 3 and the lip sealing surface 5 is long.

If, for reasons that will be given below, the length $l_{t1}$ is to be increased to a length $l_{t2}$ (FIG. 10) by increasing the abutment length ($l_{s3}>l_{s1}$), which avoids increasing the length of portion 35 of lip 11, the radial thickness $e_2$ of the distal axial abutment surface 7 becomes insufficient to ensure a sufficient value of the makeup torque to prevent undesirable breakout of the threaded tubular connection.

Figure 11:
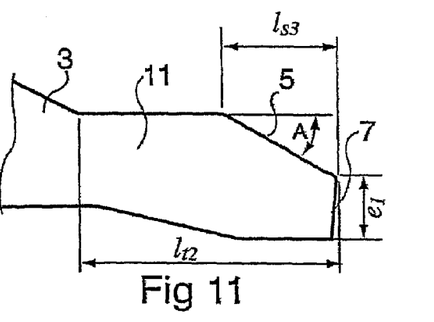

To overcome this disadvantage, the end of the lip can be tapered before machining the abutment 5 so that the internal peripheral surface has a smaller diameter (FIG. 11) towards its end; such a tapering, however, necessitates a further machining operation.

To overcome the disadvantage indicated with respect to FIG. 10, the taper of the lip sealing surface 5 (angle B<angle A=see FIG. 9) can be reduced but such a configuration leads to a large amount of friction of the bearing surfaces 5, 6 at the end of makeup from the moment at which they interfere; this results in high galling risks, in particular for certain types of materials (high Cr steels, Ni alloys . . . ).

Figure 2:
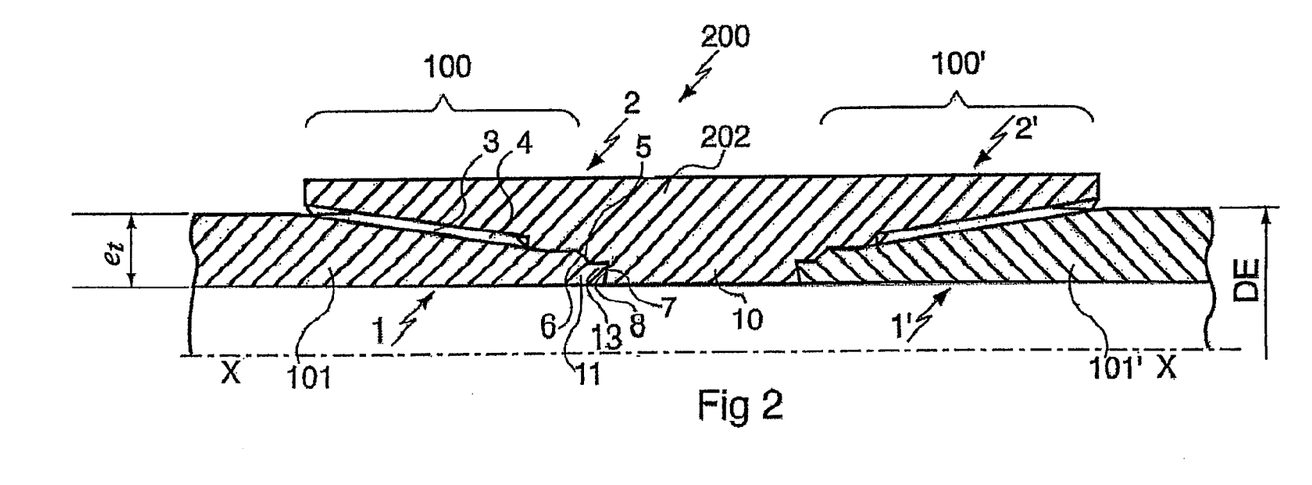
FIG. 2 shows a half axial cross section of a threaded and coupled tubular connection of the invention.

FIG. 2 shows a threaded tubular connection of the invention directly derived from that of FIG. 1 in particular by modifying the structure of the lip 11, which comprises an appendix 13, the structure of the female threaded element being adapted as a result by returning the female axial abutment surface towards the center of coupling 202; the axial length of lug 10 in FIG. 2 is shorter than in FIG. 1.

Figure 5:
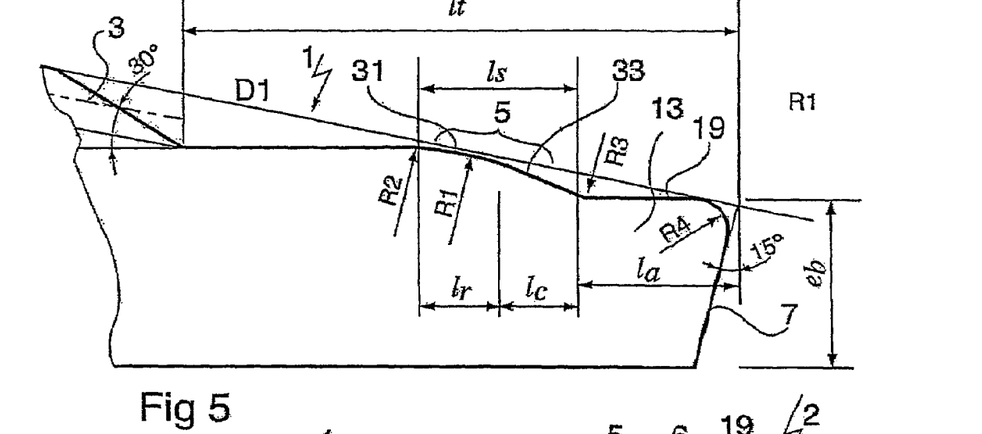
FIG. 5 is an enlargement of the free end of the male threaded element of FIG. 2.

FIG. 5 shows a detail of the male lip 11 of the threaded connection of FIG. 2.

In FIG. 5, male lip 11 with total length $l_t$ comprises a lip sealing surface 5 with a total axial width $l_s$ which is separated from the distal axial abutment surface 7 by an appendix 13 with an axial length $l_a$.

The distal axial abutment surface 7 is a concave conical surface, coaxial with the threaded connection and with an apex half-angle of 75° (angle of 15° with respect to the normal to the axis). Such a disposition is known to increase the contact pressure between the sealing surfaces 5, 6 on threaded connections of the type shown in FIG. 1.

Appendix 13 has an external cylindrical peripheral surface 19, which is connected to the distal axial abutment surface 7 by a toric surface with a low radius R4.

The axial length of appendix $l_a$ shown in FIG. 5 is about 25% of the total axial length of the lip $l_t$, these distances being taken with respect to the point of intersection of surfaces 7 and 19.

The ratio between the axial length of appendix $l_a$ and the radial thickness $e_b$ of the distal axial abutment surface is about 0.9. Too high a ratio of more than 3 risks causing buckling of the appendix.

The lip sealing surface 5 is a complex surface that is inclined to the axis (mean inclination of 15°) and is connected to appendix 13 by a toric surface with a low radius of curvature R3 and to the lip on the threading side by a further toric surface with a low radius of curvature R2.

R3, R4, for example, are of the order of 0.5 to 1 mm; R2 is of the order of 5 mm.

The lip sealing surface 5 is constituted by:
a) on the free end side 7, a conical portion 33 with a taper of 50% (i.e., an inclination of 14° to the axis) with a width $l_c$ of the order of 1.5 mm, for example; and
b) on the threading side, a toric portion 31 with a large radius of curvature R1 (for example 60 mm), with a width $l_r$ (for example 1.5 mm) which is tangential to the toric portion 33.

This enables to obtain a lip sealing surface which is short (width $l_s$ close to 3 mm) and that is much more inclined to the axis than the threading (taper 6.25%, i.e., an inclination of 1.8° to the axis), and then to minimize the risks of galling of the sealing surfaces during makeup. The moment of first contact between the sealing surfaces on makeup is delayed and the helical frictional length from this first contact is reduced.

The conical+large radius of curvature toric geometrical configuration on the threading side enables to obtain a stable contact as regards the width between sealing surfaces 5, 6 while the radial interference between the sealing surfaces 5, 6 and/or tapered threadings 3, 4 and the application of internal fluid pressure tends to "banana" lip 11 and slightly change the inclination of the male sealing surface by a fraction of a degree. Such a variation in the inclination tends to substantially reduce the effective contact width and the integrated contact pressure over the abutment width at the conical sealing surfaces.

The existence of a toric portion with a large radius of curvature R1 on the threading side (R1 is preferably between 30 and 120 mm, in the present case 60 mm) enables to preserve the advantages of a conical bearing surface under service conditions (functional stability of this abutment).

Figure 6:
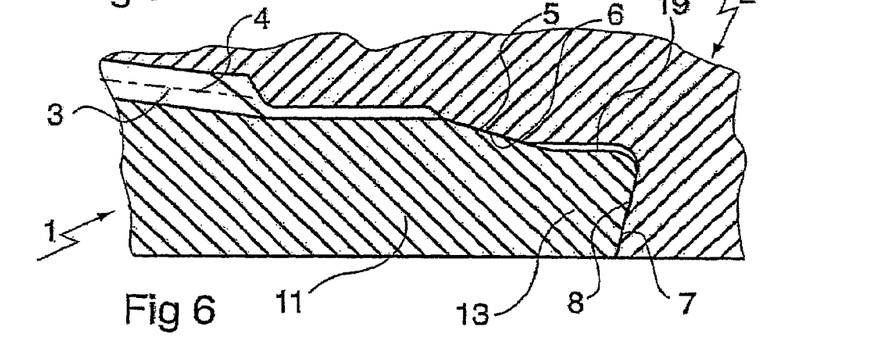
FIG. 6 shows the free end of FIG. 5 after makeup with the corresponding female portions.

FIG. 6 shows the co-operation of the means disposed on the male lip 11 and on the corresponding female portion in the made up position.

The female threaded element comprises a female axial abutment surface 8 which is convexly conical, with an apex half angle that is equal or substantially equal to that of the distal surface 7 and which forms a shoulder.

At the bottom of this shoulder, at an axial distance from the female axial abutment surface and facing the male sealing surface 5 is a conical female sealing surface 6 with a taper equal to that of the conical portion 33 of the male lip sealing surface 5.

The axial width of the female sealing surface 6 is close to the total axial width $l_s$ of the lip sealing surface 5 and is thus adapted for stable operation of these sealing surfaces in service.

The internal peripheral surface of the female threaded element between the female sealing surface 6 and the female axial abutment surface can be of any shape since it does not radially interfere with the external peripheral surface 19 facing the appendix 13.

A short radius is provided to connect this female peripheral surface to the female axial abutment surface 8.

Firstly, it should be noted that the location of the sealing surface 5 away from the free end of the lip limits bending of the lip when the threaded connection is subjected to internal or external pressure of a fluid and thus limits the reduction in effective contact width and that of the integrated contact pressure between sealing surfaces 5, 6 for threaded connections subjected to such internal or external pressures, in particular internal pressures.

Figure 12:
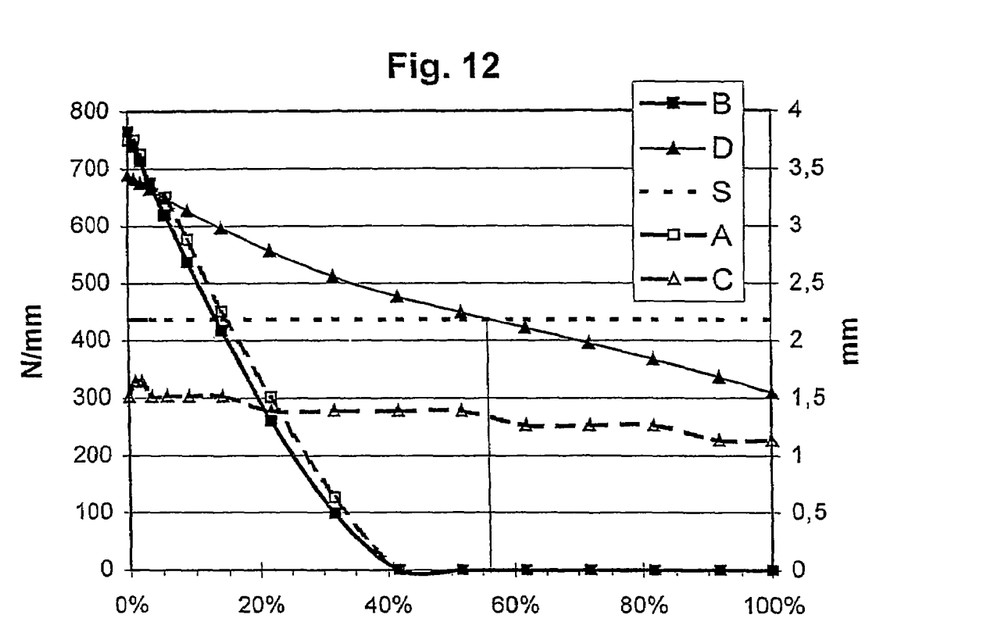
FIG. 12 shows a graph of the contact width and integrated contact pressure over this width at the distal axial abutment surface and of the lip sealing surface as a function of the axial tensile load exerted on the threaded tubular connection of FIG. 1 (prior art).
Figure 13:
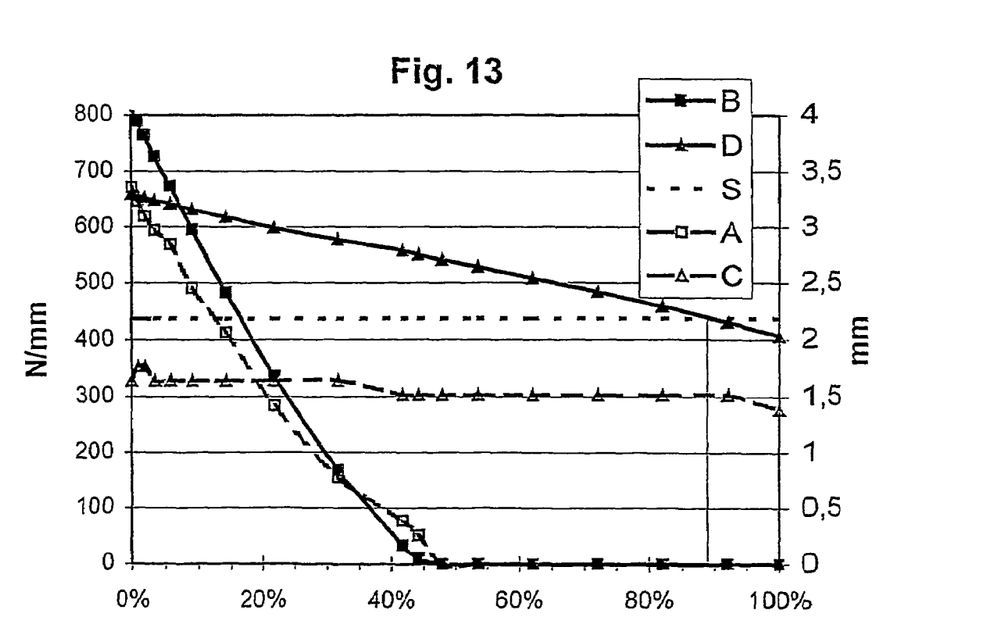
FIG. 13 shows the same graph for the threaded tubular connection of the invention of FIG. 2.

The graphs shown in FIGS. 12 and 13 illustrate a distinct advantage of the threaded connection of the invention of the type shown in FIG. 2 (FIG. 13) compared with a similar prior art threaded connection of FIG. 1 (FIG. 12).

The prior art threaded connection studied corresponds to a VAM TOP® premium threaded tubular connection as shown in VAM® catalogue n° 940 edited by Vallourec Oil & Gas in July 1994 for pipes with an external diameter of 244.48 mm and thickness 13.84 mm (9⅝"×53.5 lbft), grade L80 (minimum yield strength 551 MPa).

The threaded tubular connection of the invention has been modified simply by adding an appendix with an axial length of 3 mm ($l_a$=25% $l_t$): see FIG. 5.

Using the finished elements analysis method (FEA), we calculated the variation in effective contact width and the integrated contact pressure over this width for abutment surfaces 7, 8 and for bearing surfaces 5, 6 on a threaded connection made up to the nominal makeup torque as a function of the axial tensile load to which the threaded connection is subjected, expressed as a % of the load corresponding to the pipe body yield strength (PBYS).

Regarding the abutment surfaces 7, 8, we see that the effective contact width (curve A), initially 3.8 mm, reduces very rapidly and falls to 0 for a load corresponding to 42%

PBYS. Above this load, the abutment surfaces are no longer in contact. The integrated contact pressure between the abutment surfaces (curve B) follows the same profile (initial value 770 N/mm).

Curve C relating to the change in the contact width between the sealing surfaces indicates an effective contact width reducing from 1.5 to 1.1 mm when the axial tensile load changes from 0 to 100%.

This small variation in effective contact width is sufficient to cause the integrated contact pressure to fall from 700 N/mm to 300 N/mm for the same variation in axial tensile load (curve D).

Users have for some time considered that a risk of leakage in service exists when the integrated contact pressure calculated for finished elements is less than 437 N/mm (line S).

Such a threshold is exceeded for the prior art threaded connection when the tensile load is higher than that corresponding to 56% PBYS: the criterion employed, therefore, is severe.

It should be noted that the sealing surfaces in accordance with the test geometry correspond to those of 5 and 6 in FIGS. 5 and 6 (conical male sealing surface, 50% taper+toric sealing surface with 60 mm radius) which are considered to improve the contact stability under load with respect to simple tapered sealing surfaces.

The same calculations were carried out for the modified threaded tubular connection of the invention which was made up to the same nominal makeup torque as the prior art threaded connection.

Curves A, B, C, D and S in FIG. 13 (threaded connection of the invention) have the same meanings as those of FIG. 12 (prior art threaded connection).

Curves A, B and C in FIG. 13 are similar to those of FIG. 12.

Concerning the integrated contact pressure on the abutment surfaces (curve B), note an integrated contact pressure slightly higher than 30 N/mm and slightly delayed detachment of the axial abutment surfaces (48% PBYS compared with 42%) for the threaded connection of the invention.

The principal difference concerns the development of the integrated contact pressure between the sealing surfaces (curve D) which reduces much more slowly on the threaded connection of the invention so that the threshold of 437 N/mm (line S) is only exceeded beyond a load corresponding to 89% PBYS.

The criterion for the integrated contact pressure, which is a strict criterion, recently introduced by users highly concerned with guaranteeing seals on threaded connections, is satisfied for a wide range of service conditions for the threaded connection of the invention.

The low axial stiffness of lip 11 resulting from the presence of appendix 13 contributes to the better performance of the threaded connections of the invention as regards sealing under tension.

This low axial stiffness induces firstly, a favorable increase in radial stiffness for the seal performance of the threaded connection.

The low axial stiffness can also allow the lip at the end of makeup to store a large compression in axial deformation, which deformation can then advantageously be restored when the threaded connection is subjected to axial tensile loads.

Too short an appendix ($l_a < 8\% \, l_r$) does not cause a sufficient gain in the sealing characteristics under tensile load.

Too long an appendix ($l_a < 75\% \, l_r$) risks causing buckling of the lip and a reduction in the sealing performances.

The lip and associated means (5, 7, 13) are also relatively easy to produce by machining.

Other advantages can result from the low axial stiffness of the lip of the threaded connection of the invention.

A first additional advantage concerns the precision of the real makeup torque.

Threaded connections are generally made up into position using mechanical or hydraulic machines termed "power tongs" which develop large torques as they have to make up the threaded connection beyond contact of the axial abutment surfaces.

These tongs stop when a given makeup torque has been reached (nominal torque).

However, because of the inertia of the tongs, the real torque obtained may differ from the desired nominal torque.

This difference depends on a number of factors and can be reduced by reducing the rate of makeup, which affects the makeup productivity.

The reduction in the axial stiffness of the lip in the threaded connection of the invention enables to obtain a torque rise curve that is more shallow between contact and the final make up position and thus enables either to reduce the difference between the nominal torque and the real makeup torque, or to allow faster makeup.

A further additional advantage concerns the behavior of a threaded tubular connection under axial compressive load.

Figure 14:
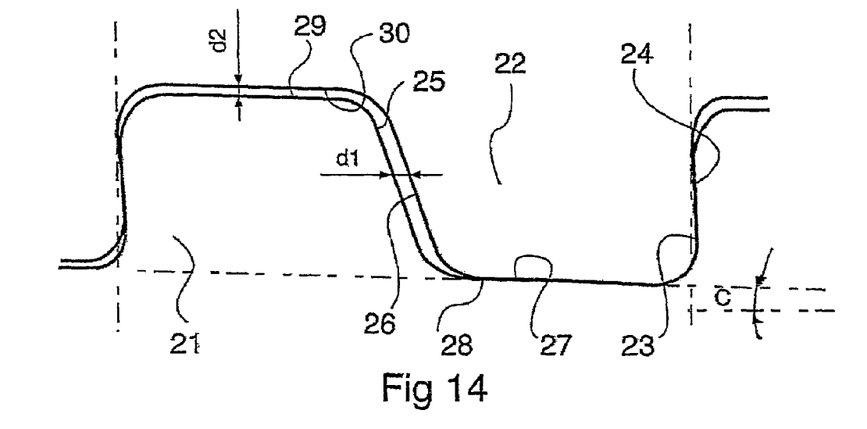
FIG. 14 diagrammatically shows a few male threads coupled with a few female threads on the threaded tubular connection of FIG. 2.

FIG. 14 illustrates the appearance of male and female trapezoidal threads 21 and 22 respectively in a threaded connection with tapered threadings made up into position.

Male threads 21 have a thread crest 29, a thread root 27 both inclined at an angle C (for example 1.8°) to the axis, a load flank 23 and a stabbing flank 25.

The female threads 22 also have a thread crest 28, a thread root 30, a load flank 24 and a stabbing flank 26.

Because of the reaction on the abutment surfaces 7, 8, the male load flanks 23 and female load flanks 24 are in contact while the stabbing flanks 25, 26 exhibit a clearance $d_1$.

Because of the taper of the threadings (angle of inclination C), the female thread crests 28 radially interfere with the male thread roots 27, while a clearance $d_2$ exists between the male thread crests 29 and female thread roots 30.

When the threaded connection is subjected to axial compressive loads, the load flanks 23, 24, which are initially in contact, detach and all of the compressive loads are then supported by the axial abutment surfaces 7, 8 in addition to the compressive stresses resulting from makeup. If the equivalent Von Mises stresses then exceed the yield strength, plasticising occurs and then there is a risk of leakage and/or galling after breakout and further makeup.

A low axial lip stiffness allows the stabbing flanks 25, 26 to come into contact, which then take up the axial compressive loads before the equivalent stress on the abutment exceeds the yield strength.

The threaded connection of the invention thus has excellent mechanical strength in axial compression.

Figure 3:
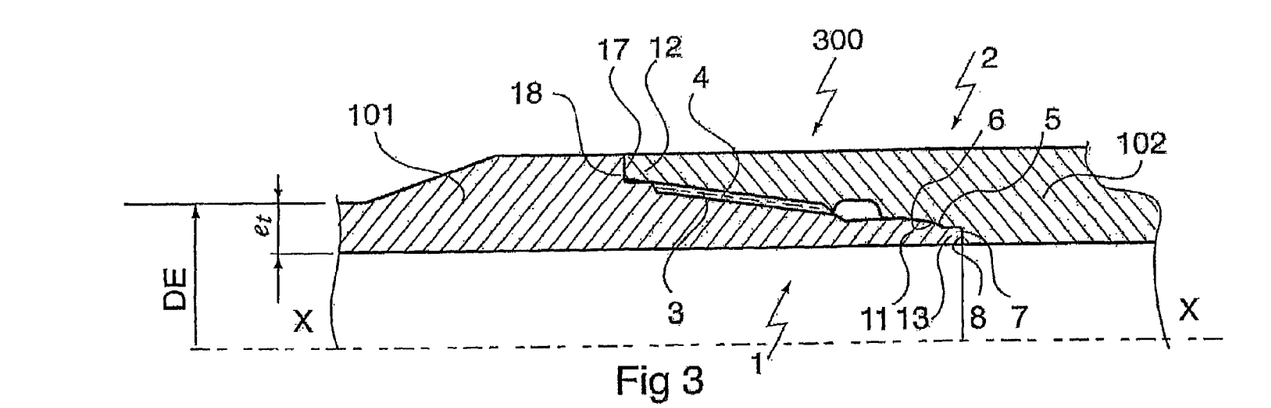
FIG. 3 shows a half axial cross section of an integral threaded tubular connection for a riser in accordance with the invention.

FIG. 3 shows a further type of threaded tubular connection of the invention, for work-over risers.

Threaded connection 300 is of the integral type, male threaded element 1 being formed at the end of a first pipe 101 and female threaded element 2 being formed at the end of a second pipe 102 by machining the pipes.

Alternatively, the threaded elements 1 and 2 may result from the thickening of the pipe ends by upsetting (increase in the external diameter and/or decrease in the internal diameter).

Alternatively again the male and female elements can be connected to the pipes, for example by welding.

This type of threaded connection comprises two pairs of axial abutment surfaces, each pair comprising a distal axial abutment surface.

A first pair, the "internal abutment" pair, is constituted as before by a distal surface 7 at the free end of the male threaded element 1 and an annular surface 8 forming a shoulder on the female threaded element 2.

The other pair, the "external abutment" pair, is symmetrically constituted by a distal surface 18 at the free end of the female threaded element 2 and an annular surface 17 forming a shoulder on the male threaded element 1.

All four axial abutment surfaces are planar, perpendicular to the axis of threaded connection 300.

A lip 11, 12 separates each abutment from the threadings.

Female lip 12 does not have a sealing surface.

Male lip 11 (see FIG. 7) comprises a lip sealing surface 5 axially separated from the distal axial abutment surface 7 via an appendix 13.

Figure 7:
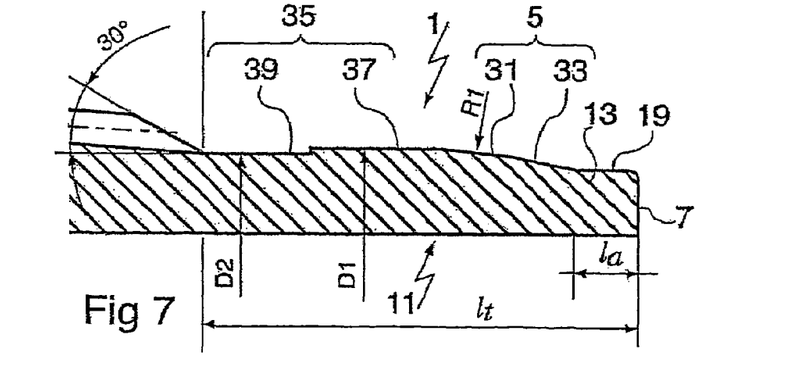
FIG. 7 shows an enlargement of the free end of the male threaded element of FIG. 3.

Sealing surface 5 is a complex surface constituted on the free end side by a conical portion 33 inclined at 50% and on the threading side 3 by a toric portion 31 with radius R1 (40 mm) tangential to the conical portion 33, the female sealing surface 6 simply being conical with a taper of 50% and with an axial width that is adapted to the total width of the male sealing surface 5.

The appendix 13 has an external peripheral surface 19 with a cylindrical shape and with an axial length $l_a$ of 5 mm, representing about 9% of the total axial length $l_t$ of the lip.

The ratio of the axial length of the appendix to the radial thickness of the distal axial abutment surface is about 0.75.

The portion of the lip located between the lip sealing surface 5 and the threading 3 comprises, on its external peripheral surface 35, two cylindrical surfaces 37 and 39, the surface 39 starting at the threading root 3 having a smaller diameter D2 than the surface 37 on the sealing surface side (diameter D1), where (D2–D1) is about 1 mm.

Such a step increases the radial stiffness of the lip sealing surface 5 and thus the contact pressures between the sealing surfaces 5, 6. It also reduces the "banana" deformation of the lip when the threaded connection 300 is subjected to internal fluid pressure. It also contributes, in combination with the appendix 13, to protecting sealing surface 5 from signs of damage in the case of misalignment on engaging the threaded elements.

The following table 1 compares the integrated contact pressures for 2 threaded connections for work over risers for pipes with an external diameter of 219.08 mm (8⅝") and 17.8 mm thickness, grade P110 (minimum yield strength 758 MPa) without an appendix 13 (prior art) and with an appendix 13 (in accordance with the invention).

At the end of makeup, surfaces 17, 18 of the external abutment are the first to come into contact (primary abutment), makeup being continued until the surfaces 7, 8 of the internal abutment come under contact pressure (secondary abutment).

Table 1 shows values for the integrated contact pressures over the contact width at the sealing surfaces, obtained by numerical calculation at the end of makeup and under axial tension.

TABLE 1

Integrated contact pressure between sealing surfaces

| | Integrated contact pressure (N/mm) | |
|---|---|---|
| | Prior art threaded connection | Threaded connection in accordance with invention (FIG. 3) |
| at end of makeup | 1286 | 1523 |
| makeup + 80% PBYS | 1214 | 1462 |
| makeup + 100% PBYS | 1188 | 1442 |

The integrated contact pressures were higher and increased a little more slowly with the threaded connection of the invention for this configuration, with first contact between the external abutment surfaces. The appendix with a very limited length (9% of the total lip length) and lip 11 were very stiff radially (10 mm thickness at step 37), and so the differences compared with the prior art threaded connection were lower than in the preceding example (VAM TOP®).

For the threaded connection 300 of FIG. 3, FIGS. 15, 16 and 17 show the limiting conditions for engagement of the threaded elements in the presence of the appendix 13.

Figures 15, 16, 17:
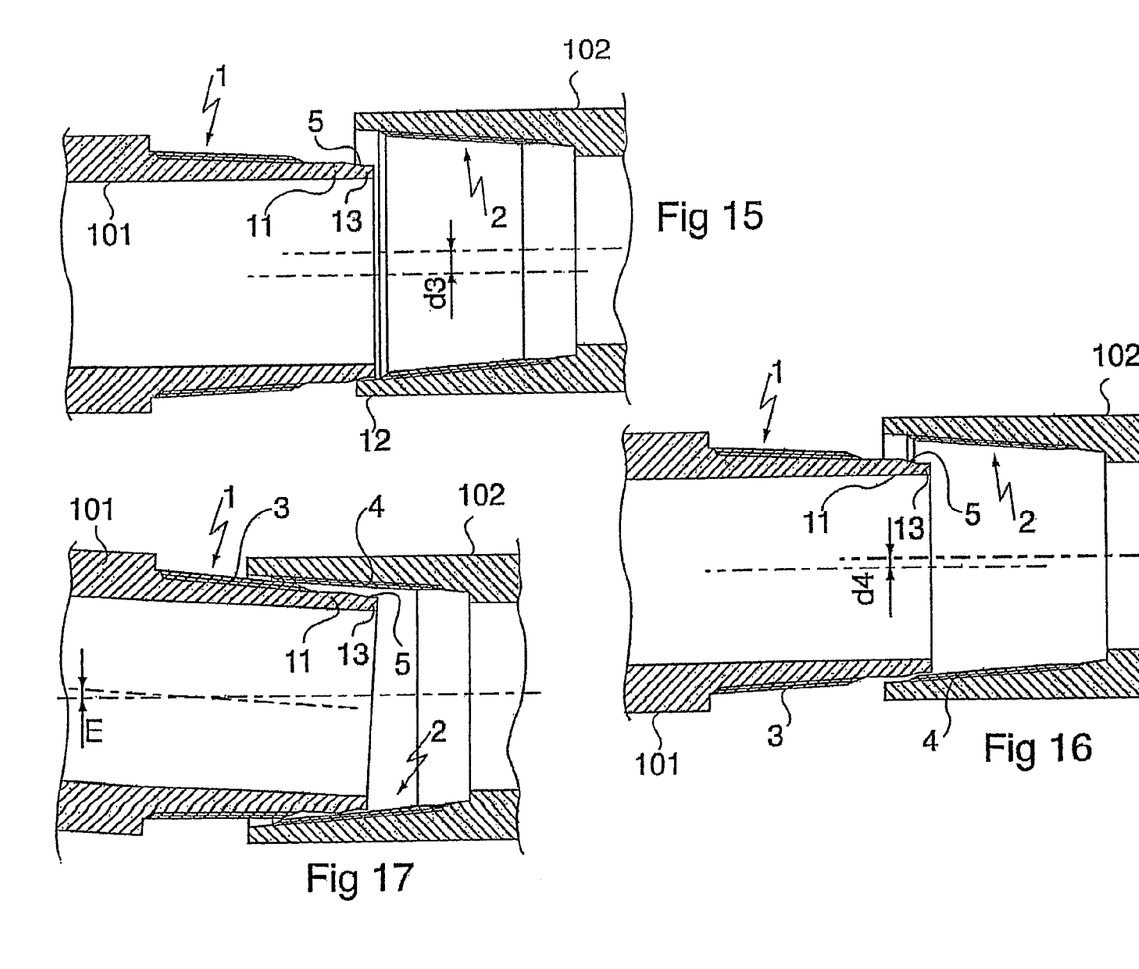
FIGS. 15, 16 and 17 diagrammatically show the dispositions of the threaded elements during engagement of these elements before makeup in the case of radial (FIGS. 15, 16) or angular (FIG. 17) misalignment.

FIG. 15 shows the maximum possible radial misalignment d3 when engagement of the threaded elements 1 and 2 commences, the male lip sealing surface 5 coming into contact with the female free end 18: d3 can exceed 10 mm for the threaded connection 300 with the dimensions given above.

FIG. 16 shows the maximum possible radial misalignment d4 a little later when the male lip sealing surface 5 comes into contact with the first female thread: d4 is about 8 mm for the threaded connection under consideration.

FIG. 17 shows the maximum possible angular misalignment E, the male lip sealing surface 5 being in contact with the female threading and the male and female threads not yet being engaged: E is about 4°.

These values of d3, d4 and E are higher than in the absence of appendix 13. The threaded connections of the invention thus better tolerate improper engagement conditions of the threaded elements.

Of course appendix 13 protects the lip sealing surface 5 from axial end shocks during on-site manipulation.

It should be noted that in the case of FIG. 17, the appendix also creates a protection or radial barrier for the conical portion 33 of the lip sealing surface, which is the most critical portion as regards sealing.

The whole of the sealing surface can also be protected if, as shown in FIG. 5, the axial length $l_a$ of appendix 13 is such that the lip sealing surface 5 is located on the threaded element side with respect to the straight line D1 passing through the crest of the first male thread and which is tangential to the free end of the threaded element. The straight line D1 constitutes, for example, the generatrix of the female thread crests in FIG. 17.

Figure 4:
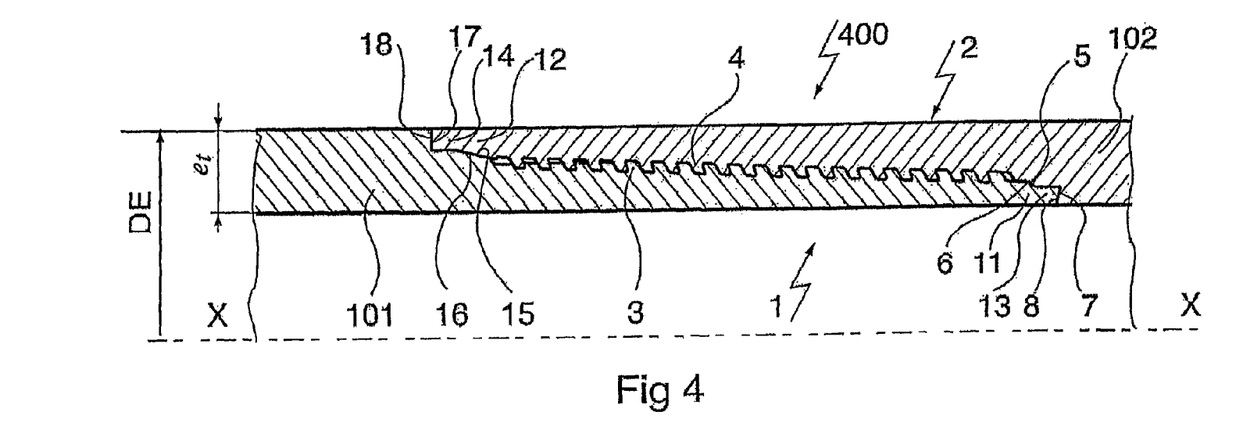
FIG. 4 shows a half axial cross section of an integral threaded tubular connection in accordance with the invention, termed a "flush" connection, i.e., with no change in the external or internal diameter at the threaded tubular connection.

FIG. 4 shows an integral threaded connection 400 known as a flush connection with a constant internal and external diameter, with internal abutment surfaces (7, 8) and external abutment surfaces (17, 18) and with 2 pairs of sealing surfaces: an internal pair (5, 6) and an external pair (15, 16).

Threaded connection 400 is sealed both to external pressures by means of the external pair of sealing surfaces and to internal pressures by means of the internal pair of sealing surfaces.

The male sealing surface 5 of the internal pair and the female sealing surface 16 of the external pair are lip sealing surfaces.

They are separated from the distal axial abutment surfaces 7, 18 on the threaded elements on which they are formed by an appendix 13, 14.

These appendices 13, 14 can reduce the axial stiffness of lips 11, 12 and render the radial stiffness of these lips a maximum.

This can maximize the sealing performances of the threaded connection both to external fluids and to internal fluids even under a relatively high axial tension.

The mechanical behavior under compression is also improved.

The low axial stiffness of lips 11, 12 allows makeup to be continued sufficiently after first contact of one internal or external abutment pair, preferably internal pair, until axial abutting contact of the second pair of abutting surfaces.

The delay in detachment of the abutting surfaces under axial tension also enables to a certain extent to prevent or in any case to limit the jarring of these surfaces in the case of a fluctuating tensile or bending load, such jarring being an initiating source for fatigue cracks by the phenomenon known as "fretting corrosion".

The present invention is not limited to the threaded tubular connections that have just been described.

It is applicable to any type of threaded tubular connection, in particular with conical or cylindrical threadings, with one or more threaded portions which may or may not be stepped, with trapezoidal or triangular threads, or with wedge threads with a variable pitch or width.

The invention claimed is:

1. A threaded tubular connection comprising:
   a male threaded element at an end of a first tubular component and a female threaded element at an end of a second tubular component,
   the male threaded element comprising a male threading, at least one male sealing surface on its external peripheral surface, and at least one male axial abutment surface,
   the female threaded element correspondingly comprising a female threading, at least one female sealing surface on its internal peripheral surface, and at least one female axial abutment surface,
   the male threading being made up into the female threading until at least one male axial abutment surface cooperates with the corresponding female axial abutment surface to produce an abutting reaction against makeup torque, each male sealing surface then interfering radially with a corresponding female sealing surface, at least one threaded element having a distal axial abutment surface among the axial abutment surface or surfaces producing an abutting reaction, formed on a front surface of the free end of the at least one threaded element, a lip separating the distal axial abutment surface from the threading on the at least one threaded element, one single lip sealing surface being disposed on the lip at an axial distance from the end of the threading, wherein
   the lip comprises, between the distal axial abutment surface and the one single lip sealing surface, an appendix having a peripheral surface facing the threaded element cooperating with the at least one threaded element that is distinct from the lip sealing surface, and
   an effective contact width where the male sealing surface and female sealing surface make contact is disposed on the one single lip sealing surface and is inclined at a taper with respect to an axis of the threaded tubular connection at a first angle, a root of the threading is disposed with respect to the axis of the at least one threaded element at a second angle, and the second angle is less than the first angle.

2. A threaded tubular connection according to claim 1, wherein the distal axial abutment surface at an end of the appendix is disposed on the lip to be first in contact with the axial abutment surface of the mating threaded element during makeup.

3. A threaded tubular connection according to claim 1, wherein a peripheral surface of the appendix facing the threaded element cooperating with the at least one threaded element shows a lack of interfering contact with the mating threaded element.

4. A threaded tubular connection according to claim 1, wherein a peripheral surface of the appendix facing the threaded element cooperating with the at least one threaded element is a substantially cylindrical surface.

5. A threaded tubular connection according to claim 1, wherein the distal axial abutment surface at an end of the appendix is a surface that extends between both of peripheral surfaces of the appendix.

6. A threaded tubular connection according to claim 1, wherein the distal axial abutment surface at an end of the appendix is a planar surface, perpendicular to an axis of the threaded tubular connection.

7. A threaded tubular connection according to claim 1, wherein the distal axial abutment surface at an end of the appendix is conical, coaxial with the threaded tubular connection and with an apex half angle in a range 70° to 90° to encourage contact of the lip sealing surface and the corresponding sealing surface.

8. A threaded tubular connection according to claim 1, wherein the appendix has an axial length in a range 8% to 75% of a total axial length of the lip.

9. A threaded tubular connection according to claim 1, wherein the appendix has an axial length and the distal axial abutment surface has a radial thickness such that a ratio of the axial length of the appendix to the radial thickness of the distal axial abutment surface is 3 or less.

10. A threaded tubular connection according to claim 1, wherein the lip sealing surface is located only on a same side as the threaded element on which it is located with respect to a straight line that passes through a first full crest, closest to the appendix, of a thread of the threading and that is tangential to a free end of the threaded element closest to the appendix, which enables to protect the one single lip sealing surface from damage during handling of the threaded elements.

11. A threaded tubular connection according to claim 1, wherein said one single lip sealing surface is a surface selected from the group consisting of conical, toric, and complex surfaces, the complex surfaces comprising combinations of conical surfaces, cylindrical surfaces, and toric surfaces.

12. A threaded tubular connection according to claim 11, wherein said one single lip sealing surface is a complex surface comprising two portions of surfaces that are mutually tangential, namely a conical portion located on a side of the distal axial abutment surface and a toric portion with a radius of more than 20 mm located on a side of threading of said at least one threaded element, and wherein a corresponding sealing surface on the other threaded element is a conical surface with a taper that is substantially identical to that of the conical portion of the one single lip sealing surface.

13. A threaded tubular connection according to claim 11, wherein said one single lip sealing surface has a mean inclination of at least 10° with respect to the axis of the threaded tubular connection.

14. A threaded tubular connection according to claim 11, wherein said one single lip sealing surface has an axial width of less than 10 mm.

15. A threaded tubular connection according to claim 1, wherein a peripheral surface of the lip located between the one single lip sealing surface and the threading comprises two generally cylindrical surfaces with different diameters, the generally cylindrical surface with a smallest diameter being connected to a root of the threading, and that with a largest diameter being connected to the lip sealing surface.

16. A threaded tubular connection according to claim 1, wherein a single threaded element has said lip with said one single lip sealing surface, said appendix and said distal axial abutment surface, the other threaded element not including all of these elements.

17. A threaded tubular connection according to claim 16, wherein the other threaded element does not include any distal axial abutment surface nor any lip sealing surface.

18. A threaded tubular connection according to claim 16, wherein the threaded element cooperating with the at least one threaded element of the threaded tubular connection includes a distal axial abutment surface, but not a lip sealing surface.

19. A threaded tubular connection according to claim 1, wherein the two threaded elements of the threaded tubular connection each have a lip with one single lip sealing surface, an appendix, and a distal axial abutment surface.

20. A threaded tubular connection according to claim 8, wherein said axial length of said appendix is in the range 20% to 60% of the total axial length of the lip.

21. A threaded tubular connection according to claim 14, wherein said one single lip sealing surface has an axial width of 5 mm or less.

22. A threaded tubular connection according to claim 1, wherein said appendix is configured to increase radial stiffness of the lip and to reduce axial stiffness of the lip with regard to a similar threaded tubular connection without an appendix.

23. A threaded tubular connection according to claim 1, wherein an entire peripheral surface of the appendix facing the threaded element cooperating with the at least one threaded element is a substantially cylindrical surface.

24. A threaded tubular connection according to claim 1, wherein said at least one threaded element, with said lip and said one single lip sealing surface, is said male threaded element.

25. A threaded tubular connection according to claim 24, wherein said one single lip sealing surface is a sealing surface of an internal pair of sealing surfaces.

26. A threaded tubular connection according to claim 25, wherein said male threaded element further includes an appendix located between a sealing surface of an external pair of sealing surfaces and an external abutment surface.

27. A threaded tubular connection according to claim 26, wherein said external sealing surface is a complex surface comprising a conical portion located on a side of the external abutment surface and a toric portion located on a side of threading of said male threaded element.

28. A threaded tubular connection according to claim 1, wherein said one single lip sealing surface is a complex surface comprising a conical portion located on a side of the distal axial abutment surface and a toric portion located on a side of the threading on said at least one threaded element.

29. A threaded tubular connection according to claim 28, wherein said toric portion has a radius of more than 20 mm.

30. A threaded tubular connection according to claim 29, wherein said toric portion has a radius between 30 mm and 120 mm.

31. A threaded tubular connection according to claim 28, wherein a corresponding sealing surface on the other threaded element is a conical surface.

32. A threaded tubular connection according to claim 31, wherein said conical surface on said corresponding sealing surface on the other threaded element has a taper that is substantially identical to that of the conical portion.

33. A threaded tubular connection according to claim 1, wherein said appendix is configured to provide a less inclined torque rise curve for the connection as compared to a similar threaded tubular connection without an appendix.

34. A threaded tubular connection according to claim 1, wherein said appendix is configured to provide an increased compression resistance for the connection as compared to a similar threaded tubular connection without an appendix.

35. A threaded tubular connection according to claim 1, comprising a pair of internal abutment surfaces and a pair of external abutment surfaces, wherein said appendix is configured so that makeup of said connection continues after a first abutting contact of one of said internal or external abutment pairs and until a second abutting contact of another one of said internal or external abutment pairs.

36. A threaded tubular connection according to claim 35, wherein said appendix is configured to limit a jarring of said internal and external abutment surfaces when said connection is under a fluctuating axial stress.

37. A threaded tubular connection according to claim 1, wherein said appendix is configured to provide an integrated contact pressure at said one single lip sealing surface above 437 N/mm for axial tensile loads up to 89% of a pipe body yield strength (PBYS).

38. A threaded tubular connection according to claim 1, wherein the appendix has a non-zero defined length.

39. A threaded tubular connection according to claim 1, wherein the appendix includes a peripheral surface facing the threaded element cooperating with the at least one threaded element, and the peripheral surface is not a continuation of the lip sealing surface.

40. A threaded tubular connection according to claim 1, wherein the single lip sealing surface and appendix meet to form a portion that is concave.

41. A threaded tubular connection according to claim 10, wherein there is a gap between the straight line and the lip sealing surface.

42. A threaded tubular connection according to claim 1, wherein a generating line of a surface between the threading of the at least one threaded element and the single lip sealing surface is parallel to a generating line of a surface of the appendix facing the threaded element cooperating with the at least one threaded element.

43. A threaded tubular connection according to claim 42, wherein a generating line of the surface between the threading of the at least one threaded element and the single lip sealing surface and a generating line of the surface of the appendix facing the threaded element cooperating with the at least one threaded element are parallel to an axis of the first tubular component.

44. A threaded tubular connection according to claim 1, wherein the appendix is free of any step facing the threaded element cooperating with the at least one threaded element.

45. A threaded tubular connection according to claim 1, wherein there is no step in an area between the one single lip sealing surface and the appendix that does not include at least one portion where the male sealing surface and female sealing surface contact each other.

46. A threaded tubular connection according to claim 45, wherein the at least one portion where the male sealing surface and female sealing surface contact each other is located between a convex area closer to the threading in an axial direction than is the at least one portion and a concave area closer to the front surface of the free end in an axial direction than is the at least one portion.

47. A threaded tubular connection according to claim 1, wherein the second angle is zero.

* * * * *

UNITED STATES PATENT AND TRADEMARK OFFICE
CERTIFICATE OF CORRECTION

PATENT NO. : 7,334,821 B2  Page 1 of 1
APPLICATION NO. : 10/493069
DATED : February 26, 2008
INVENTOR(S) : Dutilleul et al.

It is certified that error appears in the above-identified patent and that said Letters Patent is hereby corrected as shown below:

On the title page, Item (75), the 3$^{rd}$ Inventor's name has been omitted. Item (75) should read:

-- (75)  Inventors:  Pierre Dutilleul, Jeanlain (FR);
                     Gabriel Roussie, Mons en Baroeul (FR);
                     Eric Verge, Gommegnies (FR) --

On the title page, Item (73), the 1st Assignee's city is incorrect. Item (73) should read:

-- (73)  Assignees:  Vallourec Mannesmann Oil & Gas France,
                     Aulnoye-Aymeries (FR);
                     Sumitomo Metal Industries, Ltd.,
                     Osaka-shi (JP) --

Signed and Sealed this

Seventeenth Day of June, 2008

JON W. DUDAS
*Director of the United States Patent and Trademark Office*